United States Patent [19]
Levy

[11] Patent Number: 5,616,243
[45] Date of Patent: Apr. 1, 1997

[54] FILTER FOR INVERTED BOTTLE TYPE WATER DISPENSER

[76] Inventor: Ehud Levy, 5933 Peachtree Industrial Blvd. Building B, Norcross, Ga. 30092

[21] Appl. No.: 599,925

[22] Filed: Feb. 12, 1996

Related U.S. Application Data

[63] Continuation-in-part of Ser. No. 478,863, Jun. 7, 1995, which is a continuation-in-part of Ser. No. 261,998, Jun. 17, 1994, Pat. No. 5,538,746.

[51] Int. Cl.$^6$ .................................................. B01D 24/02
[52] U.S. Cl. ........................ 210/282; 210/291; 210/472; 210/473; 210/474; 210/477; 210/500.25; 210/502.1; 210/903; 210/911; 210/912; 222/189.06
[58] Field of Search ............................... 210/912, 282, 210/287, 291, 472, 473, 474, 477, 500.1, 500.25, 502.1, 903, 911; 222/189.06

[56] References Cited

U.S. PATENT DOCUMENTS

| | | |
|---|---|---|
| 1,009,437 | 11/1911 | Patnaude . |
| 1,728,646 | 9/1929 | Washburne . |
| 2,335,458 | 11/1943 | Senyal . |
| 2,372,340 | 3/1945 | Senyal . |
| 2,677,465 | 5/1954 | Meyer . |
| 2,781,312 | 2/1957 | Klumb et al. . |
| 3,355,917 | 8/1967 | Knight . |
| 3,840,153 | 10/1974 | Devlin . |
| 4,024,991 | 5/1977 | Tyson et al. . |
| 4,044,923 | 8/1977 | Gardner . |
| 4,145,291 | 3/1979 | Console et al. . |
| 4,181,243 | 1/1980 | Frahm ............................ 222/189.06 |
| 4,597,423 | 7/1986 | Chenot . |
| 4,629,096 | 12/1986 | Schroer et al. . |
| 4,757,921 | 7/1988 | Snowball . |
| 4,759,474 | 7/1988 | Regunathan . |
| 4,779,426 | 10/1988 | Desrosiers . |
| 4,830,223 | 5/1989 | Priest . |
| 4,923,091 | 5/1990 | Sutera . |
| 5,112,477 | 5/1992 | Hamlin . |
| 5,139,666 | 8/1992 | Charbonneau et al. ............. 215/308 |
| 5,173,192 | 12/1992 | Shalev ................................ 210/767 |
| 5,238,559 | 8/1993 | Nieweg . |
| 5,238,560 | 8/1993 | Lange . |
| 5,310,088 | 5/1994 | Burrows . |
| 5,415,052 | 4/1995 | Sawyer, III . |
| 5,441,179 | 8/1995 | Marsh . |
| 5,449,093 | 9/1995 | Burrows . |
| 5,486,285 | 1/1996 | Feeney . |
| 5,538,746 | 7/1996 | Levy ................................. 426/477 |

OTHER PUBLICATIONS

Publication of Elkay Advertisement For Signature 21 Coprighted 1996.

Primary Examiner—Robert J. Popovics
Attorney, Agent, or Firm—Penrose Lucas Albright

[57] ABSTRACT

A filter basket and filtration media for an inverted bottle type water dispenser which is disposed below the inverted bottle, depending from the collar of the water reservoir into the water reservoir and receiving the neck of the bottle, so that all the water discharged from the bottle passes through the filter basket in a downward direction. The filter basket has an inverted conical upper section which funnels all the water which is drained from the bottle to a filtration compartment at its lower section. The filtration compartment remains submerged in water. The filtration compartment contains the filtration media and discharges the filtered water therefrom directly into the water reservoir. Air released in the spigot when it is opened rises upwardly through the filtration media to be received in the bottle. The filtration media comprises an aluminosilicate gel with pore sizes in the range of sixty to two hundred and fifty Angstroms which provides for rapid flow of water and air therethrough. Other filtration media may be used in combination, such as activated carbon. The filter basket and filtration media is composed entirely from microwave-safe material for sterilization in a conventional microwave oven.

19 Claims, 7 Drawing Sheets

FILTER FOR INVERTED BOTTLE TYPE WATER DISPENSER

RELATED APPLICATIONS

This is a continuation-in-part of Ser. No. 08/478,863, filed Jun. 7, 1995, now allowed, which is a continuation-in-part of Ser. No. 08/261,998, filed Jun. 17, 1994, now U.S. Pat. No. 5,538,746. The disclosures of these applications are incorporated by reference herein.

FIELD OF THE INVENTION

The invention relates to a method and apparatus for filtering water in an inverted bottle type water dispenser, such as a household water-cooler or water-stand. More particularly, the invention relates to a method and apparatus, which includes a filter basket and filtration media wherein water from an inverted bottle in a water dispenser is filtered to remove dissolved oxygen and other dissolved gases and in addition, other impurities, such as chlorines, chloramines, bicarbonates and lead.

BACKGROUND OF THE INVENTION

Inverted bottle type water dispensers, commonly known as "water-coolers" or "water-stands," are often found in American homes and workplaces. They provide a source of pure drinking water in areas where the hygienic quality or the esthetic taste of the domestic water is otherwise questionable. They also provide a convenient way of cooling and/or heating the water before it is dispensed. These water-stands normally require the purified drinking water to be supplied from a source outside the home or workplace, such as the delivery of the bottled water from a supplier of bottled pure water or purchasing purified water from a vending machine.

These options can be expensive and/or inconvenient for the consumer. An attractive option for consumers is to fill the bottle directly from a household tap and filtering the water at the water-stand to provide a source of purified water suitable for drinking. This option provides a source of purified drinking water segregated from the tap water; tap water can then be used advantageously in applications where taste is of no concern, such as cleaning.

However, from time to time, the water-stand's filter needs to be replaced or disinfected due to the growth of microorganisms inside the filter. Thus, the filter should be easily installed, removed and disinfected and it is preferable that the consumer can install, remove and disinfect it himself or herself with relative ease. Further, it is preferable, from the consumer's standpoint, that the periods between disinfecting be reasonably long.

One method of extending the period between filter cleaning is to fashion the filter so that the flow of water through the filter flushes all the water previously standing in the filter and to allow convection currents to flow between the filter and reservoir. Also, if the water is heated or cooled in the reservoir, since this heating or cooling retards the growth of microorganisms, a filter which is substantially immersed in this water has its microbiological growth hindered.

It is also advantageous to the consumer that the filter be relatively inexpensive and universally adaptable to most conventional inverted bottle type water dispensers. Further, in view of water shortages being experienced in certain sections of the country, the design of the filter should provide, insofar as practical, that all the system's water be filtered and used.

Moreover, if heating or cooling systems are utilized in the water stand, scale accumulates on the heating or cooling elements, when hard water is heated or cooled, reducing the element's efficiency. Hardness also imparts an unpleasant taste to the water, especially when it is used in making coffee or tea and hardness interferes with the clarity of ice if the hard water is frozen. Thus, a superior filter used in a water-stand will soften the water as well as reduce harmful bacteria growth and remove or reduce other detrimental solutes.

Lead, zinc, copper, calcium, calcium bicarbonate, ammonia, sodium sulfite and hydrogen sulfide are examples of other detrimental solutes commonly found in tap water in the United States. Each, in sufficient quantities, is harmful if ingested or provides an unpleasant flavor to water. Accordingly, a filter, used to purify tap water in a water-stand, should remove these substances as well. Tap water in most areas of the country contains chlorines. Chlorines impart to water an unpleasant taste, especially when that water is subsequently used to make coffee. Consequently, in a system which filters tap water in an inverted bottle type water dispenser to supply purified water, chlorines should be removed as well.

Adding to the burden of prerequisites for a satisfactory filter for use in a conventional inverted bottle type water dispenser is the requirement that the filter does not significantly hinder the flow-rate of water into the reservoir from the bottle. For example, an average water cooler has a reservoir capacity of four thousand cubic centimeters. In an office of twenty-seven people with each drawing a five-ounce cup of water at a rate of ten seconds per person, this reservoir could potentially be drained in about four and one-half minutes. Therefore, it is necessary for the filter to provide for a flow-rate to the reservoir to exceed this demand.

There are many devices and methods for filtering water in an inverted bottle type water dispenser which have been disclosed. None, to the inventor's knowledge, provides a satisfactory solution to the problem, in light of the aforementioned requirements. The following cites and briefly describes a few of these devices and how they requite the imperatives indicated above.

Frank Senyal discloses an apparatus for filtering water in his U.S. Patent entitled, "Filter and Water Purifier" which issued Nov. 30, 1943 as U.S. Pat. No. 2,335,458. Here, Mr. Senyal provides a filter for a water cooler comprised of two receptacles connected in a nested, superposed relation. The first receptacle receives the neck and mouth of the inverted bottle (which is fitted with a feed tube/stopper arrangement) and utilizes a valve to direct the water flowing from a receiver to a first filter sandwiched between two screens. The water is then drained via a tube to the bottom of a second receptacle which provides for an upward flow of the water through second filter, thereupon to discharge into the water cooler's reservoir. The filter arrangement depends into the reservoir of the water cooler by an outwardly extending flange resting on the recess of the reservoir.

Mr. Senyal discloses a further water purifier for a water cooler in U.S. Pat. No. 2,372,340, issued Mar. 27, 1945 and also entitled, "Filter and Water Purifier." In this disclosure, a strainer is attached to the feed tube/stopper arrangement and water is directed to flow from this strainer to a receiver. The receiver depends into the reservoir of the water cooler and is attached to the water cooler by means of screws. Via a valve, water drains from the receiver to a filter element which provides an upward flow of the water through the filter to discharge into the reservoir. The filter element is supported on the base of the reservoir and fits, sleeve-like, over the receiver.

Both these filter arrangements have disadvantages. For example, in the former patent, Senyal discloses a unified two filter arrangement which is awkward, at best, for the consumer to install or replace. In the latter patent, the filter arrangement comprises several distinct and unconnected parts which provides unwelcome complexity to the consumer. Moreover, because in both patents the bottom section is disclosed to drain the water from its top, water below the discharge ports will be retained, therefore removing the bottom section from the reservoir requires undue effort on the part of the consumer and, further, requires that this section be drained before disinfecting. Still further, Senyal teaches in both patents that the water below the ports is pushed into the reservoir by the preceding water. Therefore when there is no longer any preceding water (i.e.—the bottle is empty), the water below the ports within the filter is substantially lost for drinking. Additionally, Senyal's relatively convoluted flow-path of water—from the bottle to a cylindrical receiver (via a strainer in the second patent), then through a valve aperture offset to a side of the bottom of the cylindrical receiver, next through a first stage filter (in the first patent), down a tube to the bottom of a second stage filter and up through the second stage filter to a discharge port on top—is inconsistent with and unappreciative of the need to provide complete flushing of the filter and to permit the occurrence of convectional currents between the filter and the reservoir. Yet further, all the water in Senyal's receiver is not necessarily flushed out by the entry of more water from the bottle, especially if there are irregularities or indentations in the sides or bottom of the cylindrical receiver.

U.S. Pat. No. 4, 145,291 which issued Mar. 20, 1979 to Console et al., entitled "Disinfecting Means Within a Water Dispenser," discloses a conical basket supported by a flange interposed between the lower end of an inverted bottle and the upper end of the container of the water dispenser. The basket is disposed inside a reservoir of the water dispenser, directly below the mouth of the inverted bottle, and contains a vented, porous capsule containing silver for the inhibition of the growth of bacteria and other microorganisms in the water.

Console et al. do not otherwise address filtering the water for particulate or other harmful solutes and, in fact, provide a vent which would allow particulates or other harmful solutes to be introduced into the reservoir. Further, although silver ions are known to have a disinfecting effect in water, silver can be relatively expensive and its presence in drinking water is not desirable.

Carl Frahm discloses in U.S. Pat. No. 4,181,243, which issued on Jan. 1, 1980 entitled "Device for Filtering Beverages," a filter element provided at the inlet of a spigot for dispensing liquids from a reservoir.

As shown, Frahm's filter assembly requires the draining of the reservoir for its installation, removal or cleaning and is, therefore, relatively inconvenient and wasteful.

"Bottle and Filter" (U.S. Pat. No. 5,139,666, issued Aug. 18, 1992 to Charbonneau at al.) discloses an unusual inverted bottle which is refilled via a refill neck with a counter-cap which records the number of times the bottle is refilled. A filter is retained inside a discharge neck. The filter element is attached to the bottle via screw-on cap and held in place by projections integral with the bottle. An air vent is provided near the filter element on the cap.

Charbonneau at al.'s invention requires a water bottle of an unusual design and a relatively complex attachment of the filter element to the bottle. Further, several pockets of water are likely to collect in the bottle which would be difficult to retrieve.

Heinrich Niewig discloses in U.S. Pat. No. 5,238,559, entitled "Filter Device," that issued Aug. 24, 1993, a filter device similar to that disclosed by Charbonneau et at. Unlike Charbonneau et at., Niewig provides a vent at the "refill" neck. Niewig's disclosure again requires a water bottle of unusual design and a relatively complex attachment of the filter element to the bottle very similar to Charbonneau et al.'s teachings on these points and, thus, Niewig shares Charbonneau at al.'s disadvantages.

In U.S. Pat. No. 5,441,179, titled "Ultra-Violet Disinfecting Device Adapted for Use with Bottled Water Dispenser" and issued on Aug. 15, 1995, Stephen Marsh discloses using ultraviolet light to eliminate biological growth in the reservoir of a water cooler.

Marsh provides an example of direction of the art toward complexity and expense. Also, Marsh provides no teachings on the removal of other harmful contaminants in the water.

Disclosed in U.S. Pat. No. 5,486,285 by Brian Feeney, "Air Met Valve for Water Cooler" (issued Jan. 23, 1996), is a filter system removably connected to the neck of a bottle of a water cooler and forming a watertight seal therewith. This system comprises a one way valve for admitting air into the bottle and a sleeve for receiving a replaceable water filter.

Feeney's design is also relatively complex. It also requires a threaded neck on the bottle to fit the threads of its filter system and is therefore specific to bottles with threaded neck, not unlike Charbonneau at al. and Niewig.

From the foregoing, it may be appreciated that there is a need for a water filter for an inverted bottle type water dispenser which is easily installed and removed, of relatively simple and inexpensive design, easily cleaned and disinfected, unwasteful of water, universally adaptable to most bottles used for inverted bottle type water dispensers, and with the dispensers as such, and filters dissolved oxygen and other dissolved gases and impurities such as lead to improve the taste and healthfulness of the water as well as softening water improving its taste and preventing scaling of heating or cooling coils in the dispenser.

SUMMARY OF THE INVENTION

In response to the above needs, I have invented a new and useful filter system and method of filtering for inverted bottle type dispensers. The filter basket depends from the collar or shoulder of the water dispenser into the water reservoir and is easy s to install and remove. The basket has a conical-shaped receiver which receives the neck and mouth of the inverted water bottle and directs the flow of water therefrom to filter receptacle. The filter receptacle contains a filter media which filters from the water oxygen, lead, zinc, copper, calcium, calcium bicarbonate, ammonia, sodium sulfite and hydrogen sulfide and softens the water. The filter media preferably also removes chlorines and chloramines.

The filter media remains submerged in the water most of the time which advantageously aids the filtering capacity and retards microorganism growth in the filter media when the water is chilled or heated.

The entire invention is relatively lightweight and manageable in size. The filter basket is composed entirely of a microwave safe material, such as polypropylene, that also withstands the heat of boiling water. Thus, disinfecting and cleaning of the filter basket is a relatively simple operation which can be accomplished, quickly and easily, in nearly all homes and offices by consumers.

DESCRIPTION OF THE PREFERRED EMBODIMENTS

Figure 1:
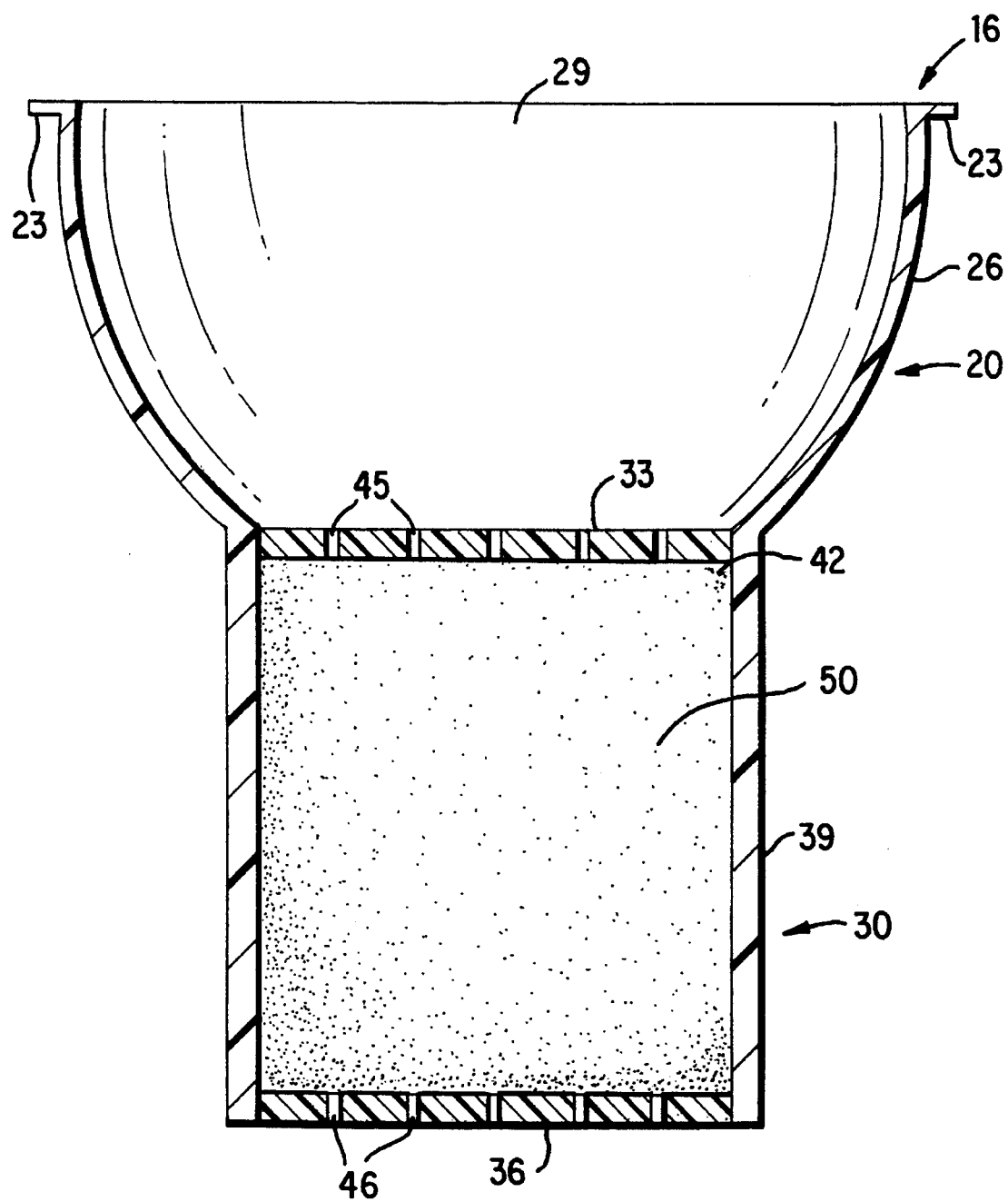
FIG. 1 is a vertical cross-sectional view of the filter basket of the preferred embodiment according to the invention.
Figure 2:
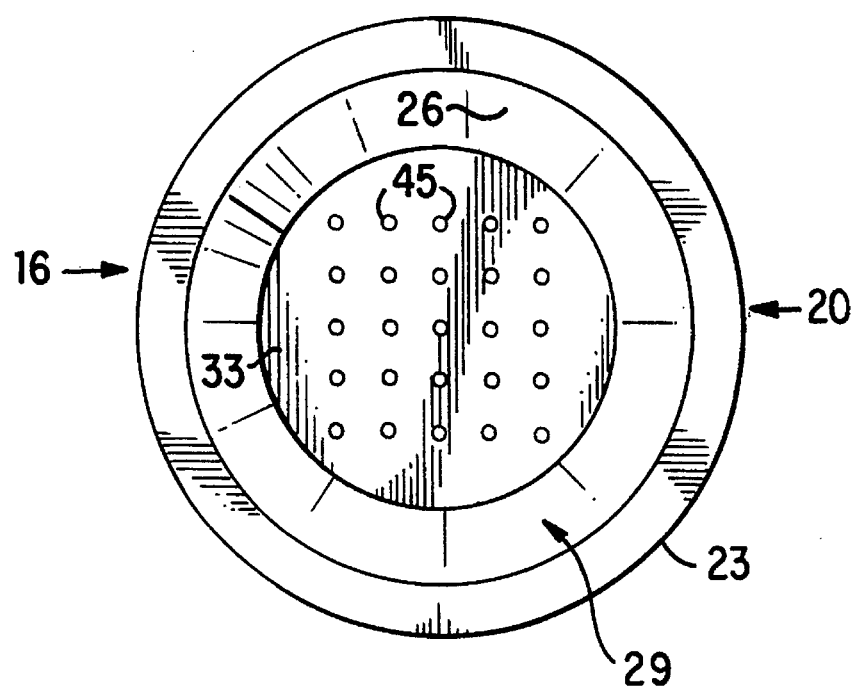
FIG. 2 is a top plan view of the filter basket of the preferred embodiment according to the invention.
Figure 3:
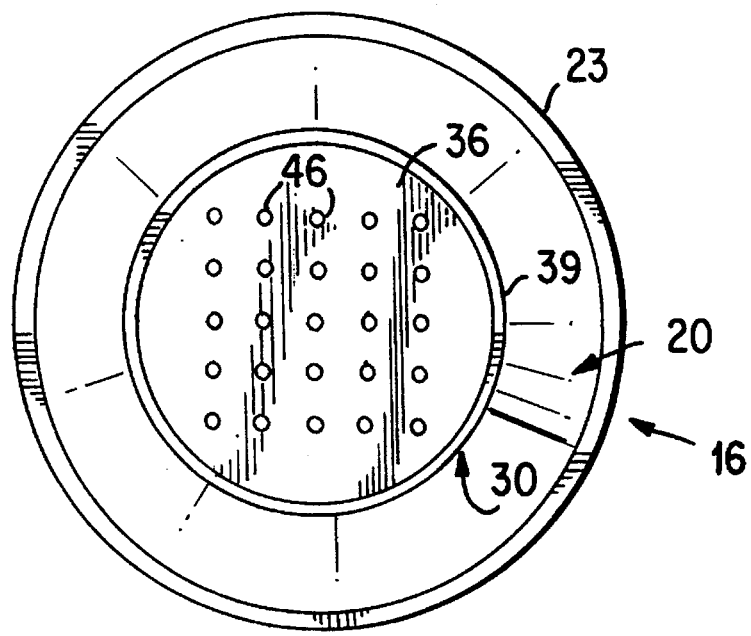
FIG. 3 is a bottom plan view of the filter basket of the preferred embodiment according to the invention.
Figure 4:
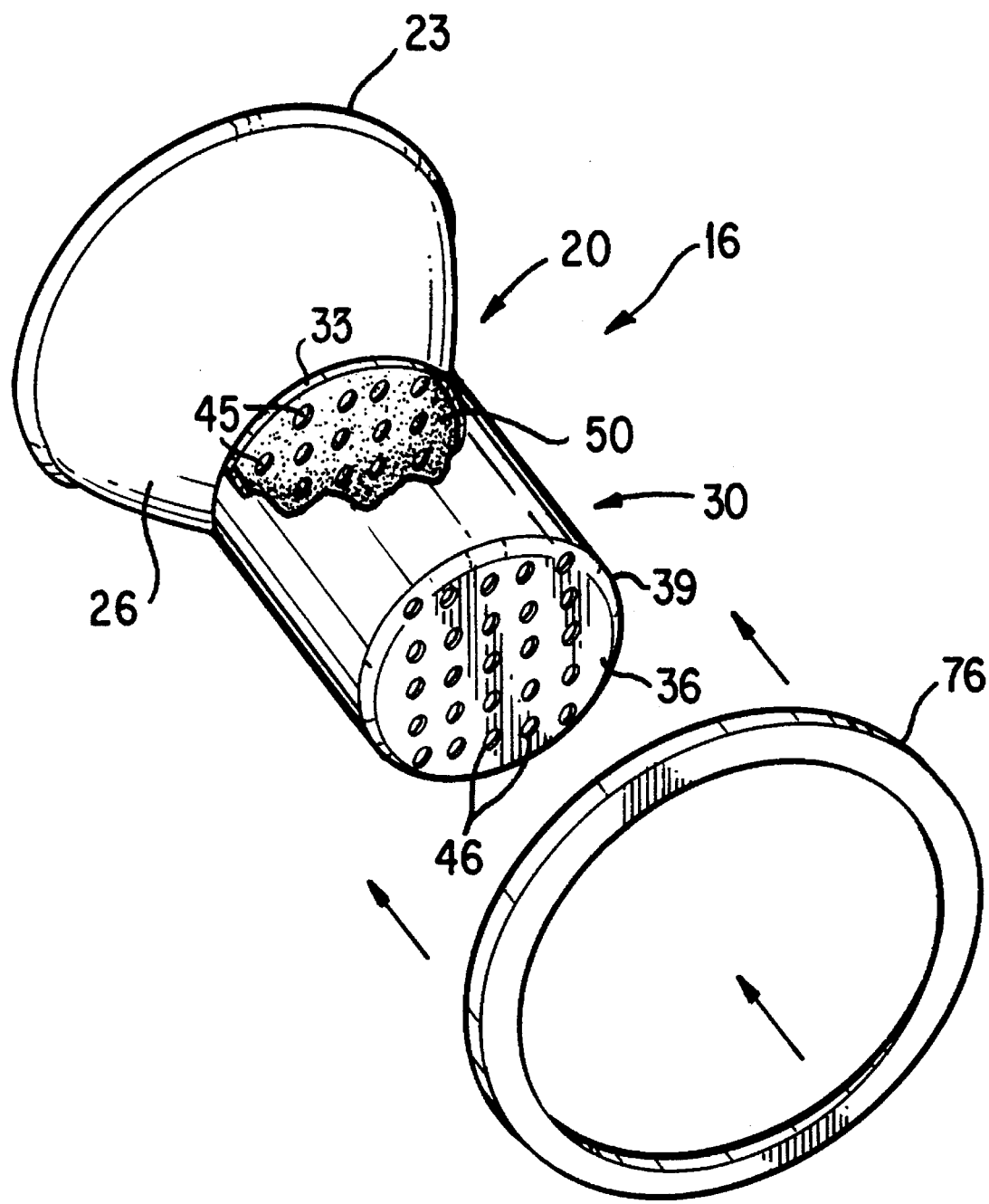
FIG. 4 is an isometric view of the filter basket of the preferred embodiment according to the invention, expanded to show a universal adapter which is used with the filter basket.

Referring to FIGS. 1 through 5, the upper portion of filter 16 is a receiver or conical section 20, preferably of circular configuration when viewed from above to match the shape of the mouth of most conventional water-stands. Receiver section 20 is funnel-shaped or conical, having convex sides in the embodiment shown, with lip or flange 23 extending outwardly about one to two millimeters on top of the convex funnel-wall 26 which surrounds the funnel's mouth 29. As seen in FIGS. 1 and 2, lip 23 extends outwardly from wall 26 at the top of funnel portion 20 around the top circumference of mouth or passage 29. Wall 26 of funnel section 20, converges downwardly (as shown in FIGS. 1 and 4) to filter section 30, providing a converging path for the flow of water to a planar plate comprising top 33 of filter section 30.

As shown in FIGS. 2 through 4, filter section 30 is preferably cylindrical in shape, preferably two to four inches in diameter, with a top substantially defined by top plate 33, a bottom substantially defined by bottom or base plate 36, and a lateral side substantially defined by cylinder-wall 39. Filter section 30 has a substantially cylindrical interior bore to define filter compartment 42.

As seen in FIGS. 2 and 3, top plate 33 and bottom plate 36 are perforated by a plurality of apertures 45 and 46, respectively, to allow the passage of water through top plate 33 and bottom plate 36. Apertures 45 and 46 are preferably about three millimeters and not less than two millimeters in diameter and provide a combined open area so that a sufficient flow rate of water through filter section 30 occurs.

The individual open area of apertures 45 and 46 are small enough to prevent filter media 50 from being carried out of compartment 42. Optionally, screening material of appropriate mesh can be used between media 50 and, respectively, top 33 and bottom 36.

Filter compartment 42 is substantially filled with filter media 50. Media 50 is sufficiently porous so that water can pass at a sufficient rate downwardly therethrough while being filtered to remove harmful or distasteful substances and so that air can rapidly pass upwardly therethrough to provide sufficient displacement of dispensed water.

Figure 6:
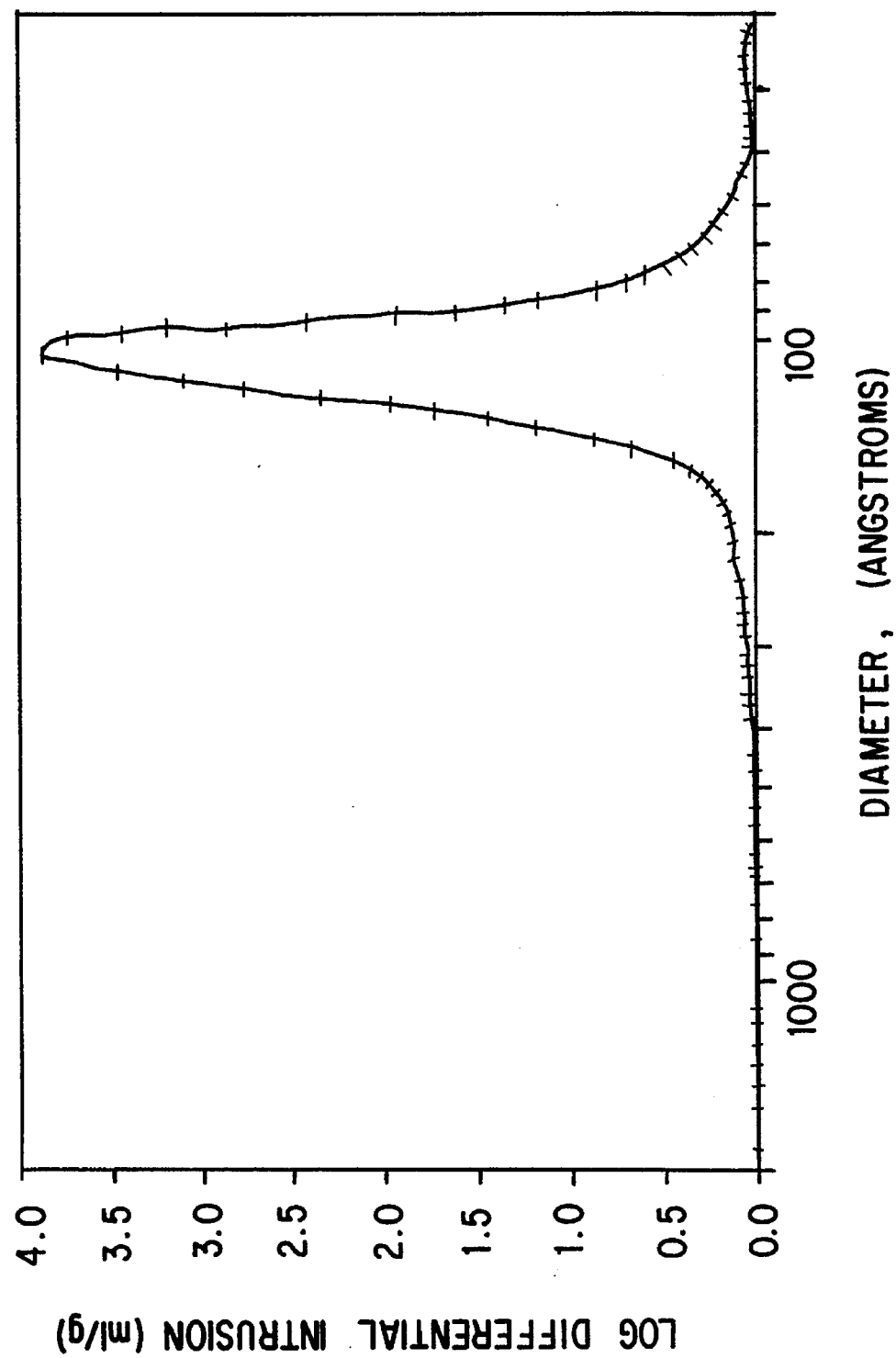
FIG. 6 is a graph of an analysis of a potassium aluminosilicate according to the invention which utilizes mercury intrusion to depict log differential intrusion in milliliters per gram for the material's pores by diameters expressed in Angstroms.
Figure 7:
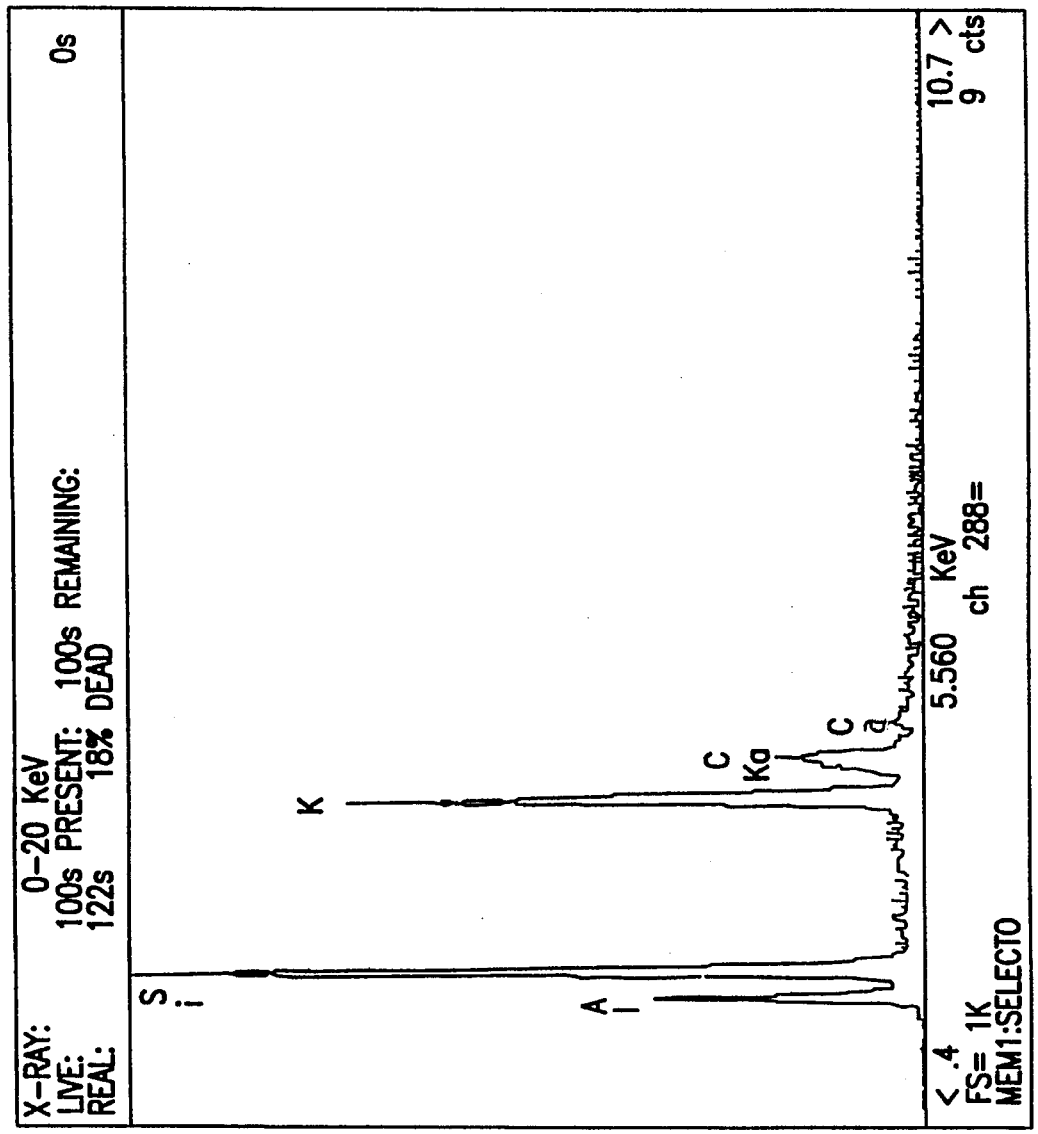
FIG. 7 is an X-ray diffraction pattern of the filtration media according to the invention.

Referring to FIGS. 6 and 7, an example of filter media 50 which is used advantageously with the filter 16 is an aluminosilicate gel which is prepared from 21% by weight of alumina hydrate type pseudoboehmiet $Al(OH)_3$ and 68% to 72% sodium silicate $Na_2O.3.22$–$2.88$ $SiO_2$, which are mixed with 11% to 14% by weight sodium hydroxide NaOH in a 5% concentration, and blended into a slurry. The slurry is filtered, washed with clean water, permitted to gel, heated with steam to initiate formation of the spongy amorphous structure, and laid over a flat bed wherein the hydrogel is formed under ultraviolet radiation (wave lengths of 2000 Å–3900 Å) at ambient temperature (20° C.–39° C.) in a low relative humidity (5%–20%) for two to ten weeks with about sixty days being typical. As a practical matter, the heat generated in this step tends to maintain the effective relative humidity in the desired range. Heat and ultraviolet radiation make the large particles intergrow to vermicular particles forming microporous spongy structures which allow water to enter, flow through and discharge therefrom very fast while the desired ion exchange takes place in the structure of the gel.

The alumina hydrate which is used has particle sizes of about five microns for about 75% of the material, and five to ten microns for about 100% of the material. Dispersed alumina can also be used.

Although after the gel has commenced to form, ultraviolet radiation is no longer necessary and the formation of the spongy amorphous structure can be completed without further subjecting the substance to such radiation, it is preferred that the radiation be continued until formation of the spongy amorphous structure of the aluminosilicate gel is complete—at least to having the desired pore sizes. Preferably, intense ultraviolet radiation is provided by ultraviolet lamps.

To substitute potassium for sodium, when the formation of the spongy amorphous structure of the gel is complete, the gel is washed with pure water and placed in a bath of a potassium salt, preferably potassium carbonate or, for example, potassium chloride, wherein the potassium displaces sodium in the aluminosilicate gel.

The resulting potassium aluminosilicate is thoroughly washed with deionized (DI) water, dried and screened to produce a particle size of 8 to 60 mesh, preferably 24×40 mesh, which is packed in polyglass or plastic cylinders or cartridges, having a total volume of about one hundred and fifty to over two hundred and fifty cubic centimeters. The resulting gel is translucent in water, but in its dry form is an opaque white, hard material similar in appearance to talc.

If the potassium aluminosilicate product is subsequently neither heated nor packed too tightly, it retains surprising large pore diameters and pore volumes as well as a large effective internal surface areas. Moreover, water flows relatively rapidly therethrough while its effective filtration characteristics are retained.

Aluminosilicate filtration media 50 is further illustrated by the following Example:

Commercial water glasses composed of 8.9% by weight $Na_2O$ and 28.7% by weight $SiO_2$, the remainder $H_2O$, were blended with 21% of $Al(OH)_3$ in crystalline powder form. Eleven percent by weight of sodium hydroxide (0.929 moles of NaOH per liter) was added and mixed until homogeneous. The mixture was transferred to a spongy amorphous structure formation tank where it was cooked with a steam batch (100° C.–200° C.) for 10–16 hours. The resulting gel was then placed into two-inch deep Pyrex trays, the depth of the gel therein being about one inch (2.5 cm).

Thereafter, the gel was exposed to continuous and intense ultraviolet radiation from both above and below the trays while formation of the spongy amorphous structure proceeded for sixty days until formation of the spongy amorphous structure was complete.

The resulting gel spongy amorphous structures were sized and screened to produce aluminosilicate particles between 8 and 60 mesh. For uses wherein the presence of sodium in aluminosilicate filtration media 50 may be considered detrimental, such spongy amorphous structures were placed in 36 liters of 5% solution of KCl for 0.2 hours which was maintained at a temperature of 20° C. to effect a complete substitution of potassium for sodium in the gel. The resulting material was washed with 200 liters of clean water until pH of 8.5 was measured.

The resulting aluminosilicate product had a total pore volume of 0.73 cc per gram and a surface area of 175 square meters per gram. The pore diameters were 100 Å to 250 Å, peaking at 160 Å. FIG. 6 is a graph which illustrates the distribution of pore diameters of another but similar sample, wherein the pore diameters were between 60 Å and 250 Å, peaking at about 115 Å.

X-ray diffraction pattern of the dry sample is shown in FIG. 7. Peaks labeled Si denote the X-ray diffraction of the standard used, $CaF_2$, Al denote impurities due to the testing equipment, and C denotes the crystalline material. From FIG. 7, it is seen that less than 1% of the sample from the Example is crystalline.

"Aluminosilicate gel" as used in the specification and claims, except as otherwise indicated, refers to an amorphous aluminosilicate material considered to encompass or be the equivalent of mesoporous molecular sieves having pore diameters within the general range of four to fifty nanometers.

The capacity of the potassium aluminosilicate filtration media 50 for oxygen removal is between fifteen and forty-five ounces of oxygen per cubic foot of the filtration media. At the same time, the filter removes virtually all ammonia ions in the water. If hydrogen sulfide is present, it is also removed. Also, a reduction was found in the levels of calcium bicarbonate, calcium, sodium sulfite, hydrogen, lead, copper and zinc, when present.

In studies of the use of the present invention, a reduction of calcium content, calcium bicarbonate content and water hardness of 100% occurred. This is believed due to ion exchange between the water's calcium ions and the potassium ions of the aluminosilicate filtration media 50. Further, it has been found that hydrogen sulfide is reduced 100%, ammonia and sodium sulfite is reduced 90% to 100%. Tests indicate that two hundred cubic centimeters of aluminosilicate filtration media can meet NSF Standard 53 for lead and zinc reduction and NSF Standard 42 for taste and odor and esthetic effects. Aluminosilicate filtration media 50 shows a kinetic of one hundred and ninety milligrams per liter of lead and demonstrates a shorter contact time than organic resin. It also exceeds EPA standards for heavy metal reduction.

The unique structure of the aluminosilicate filtration media, also, reduces bitter elements from drinking water which interferes with the taste, mainly in coffee or tea made from the water.

Aluminosilicate filtration media 50 packed inside filter 16 is preferably one hundred and fifty to two hundred and fifty cubic centimeters in volume and has the capacity to filter water for heavy material and taste of up to five hundred gallons. The micron rating for filter 16 with aluminosilicate filtration media 50 is preferably approximately fifty microns although in some applications, where the user is less concerned about flow rate and more concerned about sanitation, a one micron rating is preferable. Nevertheless, at fifty microns, flow rates of water to reservoir 73 of one thousand, five hundred cubic centimeters per minute have been observed. This rapid flow rate is believed to result from the unique porosity of media 50 which allows swift passage of air and water therethrough. Furthermore, the volume of media 50 depends upon the desired flow-rate of water. Adequate flow rates are obtained with media 50 having a volume as low as five cubic inches.

The aluminosilicate filtration media 50 can function at pH of 5.5–9 without affecting the performance of the filter in taste improvement and lead reduction.

Other filtration media 50 can be used advantageously in filter 16 such as: activated carbon, organic ion exchange media, aluminum oxide, metal oxide resins, and strong base anion resin, or a mixture of any of these and the aluminosilicate media described hereinbefore. Activated carbon is a very effective dechlorinator. For example, a mixture advantageously used for media 50 is a mixture of fifty to sixty per cent by volume of granular potassium aluminosilicate media, 20×40 mesh, and forty to fifty per cent by volume of three mesh granular activated carbon. Three mesh granular activated carbon, mixed in the media at fifty per cent by volume, provides sufficient porosity to media 50 while providing for the removal of chlorine from water 79.

The potassium aluminosilicate gel is advantageously formed in different configurations and different ratios of mixture with carbon to compose media 50. As a representative illustration, media 50 utilizing the potassium aluminosilicate gel in extruded form, which uses a fine particle size such as twenty to forty micron, with the activated carbon more or less the same size, a beneficial ratio is ten to fifteen per cent by volume potassium aluminosilicate gel to eighty-five to ninety percent activated carbon or other media.

Figure 5:
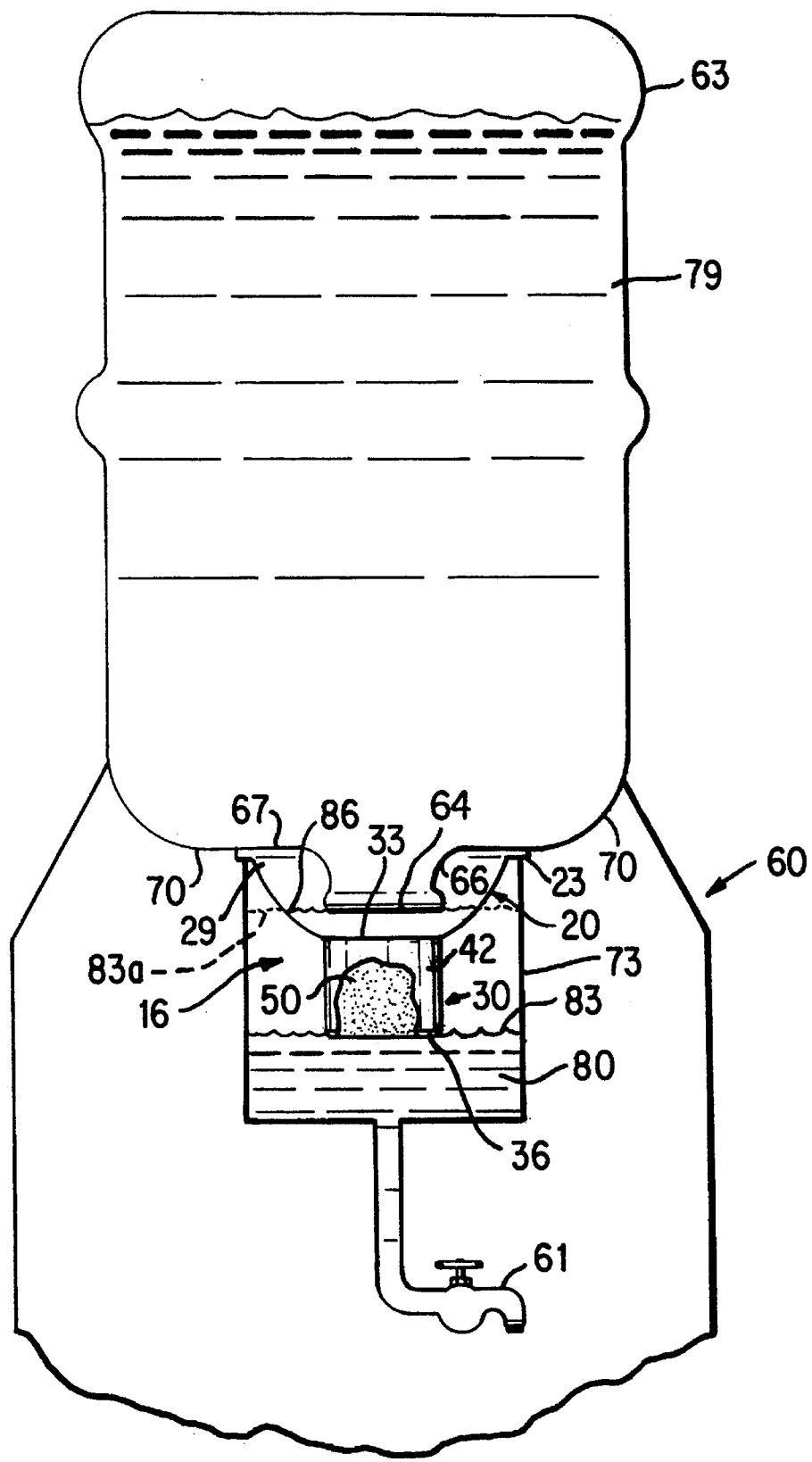
FIG. 5 is a front elevational view of an upper section of a conventional household water-cooler, shown by way of example, wherein the filter basket and reservoir of the dispenser are shown in section.

Referring to FIG. 5, filter basket 16 is easily installed in conventional inverted bottle type water dispenser or olla 60. With water-bottle or carboy 63 removed from dispenser 60, basket 16 is placed over and into fill-port or mouth 67 with flange 23 resting on collar or shoulder 70 of dispenser 60 and the rest of basket 16 depending therefrom into reservoir 73. If desired the water available from the water-stand is increased by pouting tap water from a conventional source (such as a pitcher) through basket 16, intervening media 50, to be received in reservoir 73 to a level above top plate 33 and above the level of where bottle opening or mouth 64 will be located when bottle 63 is inverted and received in olla 60.

Generally, the shoulder of carboy 63 bears directly on lip 23. However, to adapt basket 16 to reservoir 73 which basket 16 does not fit, appropriately configured spacer rings or doughnut shaped members (not shown) may be fitted between the top of reservoir 73 and lip 23. Also, if desired, gaskets may be provided, either over or below or both, on lip 23 and/or any spacer provided.

Flange 23 has an outside diameter slightly greater than most conventional fill-ports 67 found in water dispensers 60 to provide support from collar 70 for basket 16. But to accommodate a larger diameter, universal adapter ring or doughnut ring 76 is advantageously also provided with the invention to be removable attached to lip 23 and thereby extend the reach for support for filter 16 (as shown in FIG. 4).

For clarity, adapter ting 76 is only shown in FIG. 4. The manner in which ring 76 provides support for basket 16 from dispenser 60 with a large diameter fill-mouth 67 will be obvious to one skilled in the art familiar with this description. Ring 76 has an inside diameter slightly less than the outside diameter of lip 23. Adapter ring 76 has an outside diameter greater than found in larger inlet holes 67 of most common inverted water bottle type water dispensers 60. By slipping filter 16 through ring 76 until lip 23 contacts adapter ring 76, filter 16 can be supported from collar 70 for almost any large mouth 67 found in a common inverted water bottle type water dispenser 60.

Water-bottle or carboy 63 is filled from an ordinary household water tap or any other suitable source of water 79. With basket 16 depending from collar 70 into reservoir 73, bottle 63 is inverted over and-set upon dispenser 60 so that neck 66 and bottle-opening 64 are received into passage 29 (as seen in FIGS. 5) and bottle-opening 64 is one-quarter to one-half inch above cover 33 of filter compartment 42. Unless water has already been added to reservoir 73 to receive bottle opening 64, water 79 drains from bottle 63 into receiver 20. Due to the inverted conical shape of receiver 20, water 79 flows in a downwardly directed converging flow-path so that all the water received into receiver 20 flows downwardly through filter section 30. The funnel shape of mouth 29 prevents water 79 from standing, substantially unaffected by normal flow, in any part of receiver 20.

From receiver 20, water flows downwardly through perforations 45 of top plate 33 into filter compartment 42 where it is filtered of deleterious substances by filter media 50. Filter media 50 drains the purified water 80 to bottom plate 36 where the perforations 46 allow water 80 to drain into reservoir 73.

Unless previously filled, water 80 fills reservoir 73 until the surface level of water 80 rises higher than bottom plate 36 to engulf bottom-opening 64, thus substantially preventing the further reception of air into basket 16 and creating reservoir water head surface 83. (If, however, water was initially added to reservoir 73, head surface 83 will be initially higher until lowered by usage of water from dispenser 60.) Untreated water 79 from bottle 63 continues to fill basket 16, being exchanged with the air therein, until it reaches a level slightly above opening 64 and forming basket water head surface 86.

The foregoing description presumes a hermetic seal between the atmosphere and the space above filter basket 16 and another hermetic seal between the space above basket 16 and reservoir 73. As a practical matter though, a completely airtight seal between either or both of these spaces would be rare; normal operation would include at least some ventilation through these spaces, ranging from ventilation which is virtually absolute, wherein these spaces remain substantially isopiestic throughout the operation of dispenser 60, to ventilation which is virtually nil, wherein the pressure in the spaces equalizes over a significant period of time. Accordingly, in ordinary circumstances, surface head 83 will, at least eventually, equal the height of surface head 83a (depicted in FIG. 5 as a dashed line), which is equal to the height of surface head 86.

As shown in FIG. 5, filter basket 16 operates well even without ventilation for the space between the top of filter basket 16 and the bottom of bottle 63 (i.e.—mouth 67 is hermetically sealed by the contact between bottom of bottle 63 and collar 70 and by the contact between flange 23 and collar 70). When, for example, five ounces of water 80 is drained from reservoir 73 via valve 61, a substantially equal volume of air will enter reservoir 73 through either valve 61 or another venting system for reservoir 73 and surface head 83 will drop down below bottom plate 36. Air then vents into basket 16 through perforations 46, and passes through filter media 50 and perforations 45, into receiver section 20. Five ounces of water 80 drains from basket 16 into reservoir 73, raising head 83 again above plate 36 but dropping surface head 86 below opening 64 of bottle 63. With opening 64 exposed, air vents from receiver 20 into bottle 63 which permits water 79 to drain from bottle 63 into receiver 20 until, once again, head 86 covers opening 64. Of course, if air passed through filter 16 directly into bottle 63, without first entering the space above surface head 83 of reservoir 73 and/or the space above surface head 86 in receiver 20, dispenser 60 will still operate effectively in the same manner. Thus, since media 50 is exceptionally porous as well as being effective, this invention overcomes the requirement of a complex mechanism for venting by utilizing the venting system already existing for reservoir 73.

Again, as a practical matter, the described hermetic sealing seldom occurs; ordinarily, there will be some amount of ventilation between these spaces and, at least eventually, head 83 will equal head 83a.

Because receiver 20 covers fill-mouth 67, virtually all particulates on top of bottle 63 and on neck 66 are prevented by filter 16 from entering reservoir 73. Still further, when bottle 63 is removed from dispenser 60, any airborne particles are prevented from entering reservoir 20 by filter 16. Also, due to its funnel-shaped top, filter 16 prevents any leaking on the floor from tilting of bottle 63.

Figure 8:
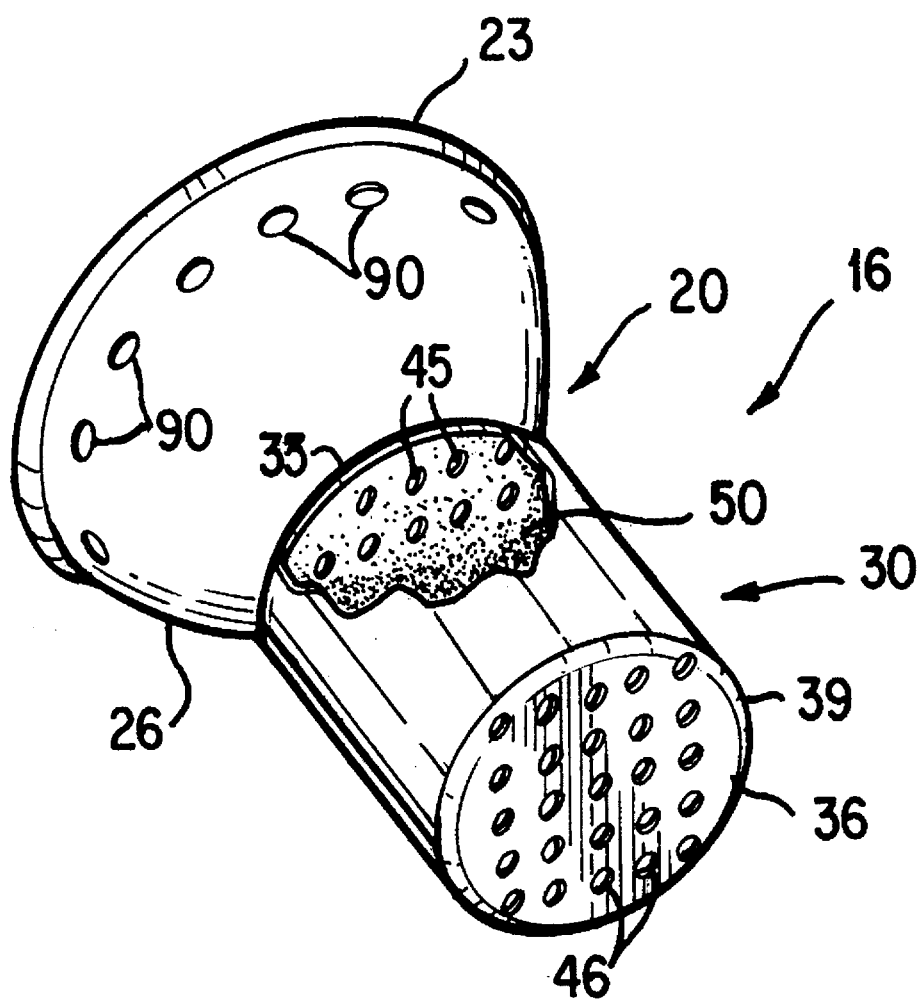
FIG. 8 is an isometric view of an alternative embodiment of the present invention.

Referring to FIG. 8, an alternative embodiment of filter basket 16 is shown which is identical to the embodiment previously described except vent holes or channels 90 are disposed in wall 26 (above the level of head 86 in receiver 20) to provide ventilation directly between receiver 20 and reservoir 73. In this case, the level of head 83 equalizes with the level of head 86, that is, at a level covering bottle-opening 64 and equal to the level of surface head 83a (shown in dashed lines in FIG. 5). For example, when five ounces of water are dram from reservoir 73 and a substantially equal volume of air is vented into reservoir 73, the air is further vented through channels 90 into receiver 20 and the water level 86 of receiver 20 and the water level 83 of reservoir 73 drops to an equal level below opening 64. Air then vents into bottle 63 through opening 64 displacing an equal volume of water in bottle 63 to receiver 20 and raising the heads 86 and 83 in receiver 20 and reservoir 73, respectively, to a level, once again, above the level of opening 64. This embodiment provides the advantage of utilizing the full working volume of reservoir 73, in the case of a hermetic seal being formed as described previously or, in the case of a near hermetic seal, prolonging the filling of the working volume of reservoir 73.

In either embodiment of the invention, filter media 50 remains, advantageously submerged in water and the water in filter 16 remains exposed to normal currents and mixing which occur in reservoir 73.

Filter 16 can be utilized advantageously in dispenser 20, which also treats bottled water 79 to dispense ice, chilled water, hot water and/or carbonated water, to improve pellucidity, taste and hygiene of water 79. When water 80 is chilled in reservoir 73, it has been observed that the cool temperatures of 34° F. to 39° F. assist filter media 50 in improving its adsorption capacity and reduce microbiological growth. Moreover, salts associated with water hardness tend to precipitate as a scum in hot beverages, such as coffee or tea and dissolved gases, such as oxygen, are responsible for negative consequences relative to the appearance and taste of hot beverages. By media 50 removing these deleterious substances from the water used to make the hot beverages, the resulting hot beverages are improved in taste and appearance. Further still, in removing dissolved gases, such as oxygen, and hardness from the water, the water becomes a better medium for carbonation, if desired. In any condition water 80 is served, if water 79 was originally wanting in qualities of clarity, sanitation, softness, taste or healthfulness, after having passed through filter 16, these qualities will be improved.

Filter 16 is normally and aesthetically hidden from apparent view since it depends into reservoir 73 and is covered by bottle 63. But if the configuration of reservoir 73 prevents filter basket 16 from fully depending into it by, for example, heating or cooling coils or a carbonator in the space of reservoir 73, filter basket 16 is raised, by means obvious and well known in the art, such as a spacer, to the desired height. Nevertheless, bottom 36 must still depend within reservoir 73 or be in watertight communication therewith.

Filter 16 is preferably constructed of plastic or other microwave-safe material. If compartment 42 and/or funnel section 40 is constructed of any non-microwave-safe material they then must be detachable from filter 16. Also, ring 48 need not be constructed of microwave-safe material since it is not normally firmly secured to filter 16. The rest of filter 16 (and preferably all of filter 16), including filter element 50, is microwave-safe. Typically, the size of filter 16 is not larger than will easily fit in a conventional microwave oven. Accordingly, filter 16 can be easily disinfected in a household microwave oven. Filter 16 is adequately sterilized utilizing a normal household microwave oven in three minutes. Alternatively, filter 16 can be sterilized in boiling water. It has been observed that filter 16 normally requires sterilization every thirty to sixty days.

Filter 16 is easily removed from dispenser 60 since it is not rigidly attached to dispenser 60. Filter 16 is removed by merely removing (preferably) empty bottle 63 and simply lifting out filter 16 from reservoir 73.

As stated hereinbefore, the operation of the invention as described with reference to FIG. 5 assumes that the space above head 86 is substantially hermetically sealed, whereas the space in reservoir 73, above head 83, is at least sporadically vented (i.e.—by opening of spigot 61). However, whether the space above head 86 is vented, intentionally or unintentionally, the device operates substantially as described in reference to FIG. 8, irrespective of vents 90 in the FIG. 8 embodiment. This adaptability of the invention is a definite asset to the user who therefore need not normally be concerned about whether or not the fit of bottle 63 to olla 60 prevents or permits the passage of air.

Although this invention has been disclosed and discussed primarily in terms of specific embodiments thereof, it should be understood that this description has been given for clearness of understanding only, and no unnecessary limitations should be understood therefrom, and that modifications which will be obvious to those skilled in the art upon becoming familiar with the invention are within the spirit and scope of the appended claims.

Having disclosed my invention, what I claim as new and to be secured by Letters Patent of the United States is:

1. A filter basket for an inverted bottle type water dispenser comprising:

a top section and a bottom section,
said top section comprising a top end, a bottom end, a passage and a wall,
said top end comprising a first opening,
said bottom end comprising a second opening,
said passage connecting said first opening and said second opening,
said passage providing water discharged from an inverted bottle of said water dispenser a downwardly directed flow path to said second opening,
said wall circumscribing said passage and connecting said top end and said bottom end,
said bottom end attached to said bottom section,
said bottom section comprising a top side, a bottom side, a compartment, a further wall and a filtration media,
said bottom section disposed in a water reservoir of said inverted bottle type water dispenser,
said top side disposed below an opening of said bottle of said inverted bottle type water dispenser,
said top side comprising a area approximately equal, in size and shape, to said area of said second opening whereby said downwardly directed flow path of said gravity-fed water is substantially obstruction-free between said second opening and said top side,
said top side comprising a first plate,
said first plate comprising means for downwardly directed flow through said top side of said gravity-fed water from said bottle directly into said compartment,
said compartment disposed below said top side,
said further wall circumscribing said compartment and connecting said top side and said bottom side,
said filtration media disposed within said compartment and submerged in said water,
said filtration media comprising means for filtering said water from said bottle of said inverted bottle type dispenser,
said bottom side comprising a second plate,
said second plate comprising means for downwardly directed flow of said gravity-fed water through said bottom side directly into said reservoir.

2. A filter basket as claimed in claim 1, wherein said top section is substantially funnel-shaped, said first opening comprising a larger area than said second opening, said passage converging downwardly from said first opening to said second opening.

3. A filter basket as claimed in claim 1, wherein said first opening receives and surrounds a neck of said bottle.

4. A filter basket as claimed in claim 1 further comprising:
supporting means disposed at said top end,
said supporting means comprising a radially outward extending lip,
said lip supporting said filter basket from a shoulder of said water dispenser.

5. A filter basket as claimed in claim 1, wherein said filter basket is substantially composed microwave-safe material.

6. A filter basket as claimed in claim 1, wherein said top side is disposed a distance below said opening of said bottle of said inverted bottle type water dispenser which is in a range from at least approximately one-quarter inch up to approximately one-half inch.

7. A filter basket as claimed in claim 1, wherein said filtration media comprises an adsorbent material composed of an aluminosilicate gel which is, at least in part, a spongy amorphous material, said material having been subjected to ultraviolet radiation during its formation of its said spongy amorphous structure to produce pores having diameters between about 60 Angstroms and about 250 Angstroms.

8. A filter basket as claimed in claim 7, wherein said filtration media further comprises one or more substances selected from a group consisting of activated carbon, organic ion exchange media, aluminum oxide, metal oxide resins, and strong base anion resin.

9. A filter basket as claimed in claim 7, wherein said filtration media further comprises three mesh granular activated carbon.

10. A filter basket as claimed in claim 1, wherein said filtration media removes one or more substances selected from the group consisting of oxygen, lead, zinc, copper, calcium, calcium bicarbonate, ammonia, sodium sulfite and hydrogen sulfide from said water.

11. A filter basket as claimed in claim 10, wherein said filtration media further removes chlorine and chloramines from said water.

12. A filter basket as claimed in claim 1 further comprising:
means for venting air into said bottle,
said venting means consisting essentially of an air flow passage which passes from said reservoir through said filtration media into said top section and through said bottle-opening and into said bottle.

13. A filter basket as claimed in claim 1, wherein said top section further comprises vent channels, said vent channels disposed on said wall at a level higher than said opening of said bottle is received in, said vent channels providing a means of ventilation between said reservoir and said bottle.

14. A filter basket as claimed in claim 1, wherein said means for downwardly directed flow through said top side of said water from said bottle directly into said compartment comprises perforations in said top plate and said means for downwardly directed flow of said water through said bottom side directly into said reservoir comprises further perforations in said bottom plate.

15. A filter basket as chimed in claim 14, wherein each of said perforations and said further perforations have a cross-sectional area of about three square millimeters or more.

16. A filter basket as claimed in claim 1, wherein said filter basket has a micron rating in a range not greater than fifty microns and not less than one micron.

17. An apparatus for filtering water which is gravity-fed from a bottle to a water reservoir of an inverted bottle type water dispenser comprising:
a cylindrical filter basket and a funnel-shaped receiver,
said filter basket and funnel-shaped receiver composed of microwave-safe material,
said filter basket disposed depending from said funnel-shaped receiver in said water reservoir, below a mouth of said bottle,
said filter basket comprising a filter compartment and filtration media,
said filter compartment comprising a bottom side, a lateral side and a top side,
said bottom side comprising perforated base plate,
said perforated base plate rigidly connected to said lateral side,
said perforated base plate comprising a plurality of perforations,
said plurality of perforations providing means for said water to drain from said filter compartment downwardly and directly into said water reservoir,
said lateral side laterally enclosing said filter compartment and connecting said bottom side and said top side,
said top side disposed below said mouth of said bottle at a distance of up to one-half inch,
said top side comprising a perforated cover,
said cover rigidly connected to said lateral side,
said cover comprising a plurality of apertures,
said plurality of apertures providing means for said water to flow downwardly through said cover directly into said compartment,
said filtration media comprising means of filtering from said water one or more substances selected from the group consisting of oxygen, lead, zinc, copper, calcium, calcium bicarbonate, ammonia, sodium sulfite and hydrogen sulfide,
said filtration media disposed in and substantially filling said filter compartment,
said filtration media further disposed completely immersed in said water,
said funnel-shaped receiver comprising a bottom part, a top part, and a receiver wall,
said bottom part rigidly connected to said top side of said filter compartment,
said bottom part comprising a first opening,
said first opening comprising an area approximately equal to the area of said cover,
said first opening disposed below said mouth of said bottle and above said cover and providing means for said water to flow downwardly to said cover substantially without obstruction therebetween,
said top part comprising a second opening and a supporting element,
said second opening comprising a larger area than said first opening,
said second opening disposed over said first opening and in a horizontal plane over a lower horizontal plane in which said mouth of said bottle is disposed,
said second opening receiving and surrounding a neck of said bottle,
said supporting element providing means for supporting said apparatus on said water dispenser,
said supporting element comprising a radially, outwardly extending lip,
said lip mounted on and supported by a shoulder of said water dispenser,
said receiver wall connecting said top part to said bottom part,
said receiver wall smoothly diverging from said bottom part to said top part,
said receiver wall providing a gradually downwardly converging downward flow path for said water to said first opening.

18. An apparatus as claimed in claim 17, wherein each of said perforations and each of said apertures have a diameter in the range from about two to three millimeters.

19. An apparatus as claimed in claim 17, wherein said filtration media further comprises means for removing chlorine and chloramines from said water.

* * * * *